Jan. 1, 1963  M. BUNIN  3,070,920
PUPPET LIKE FIGURE AND ANIMATION APPARATUS
Filed Aug. 4, 1960  2 Sheets-Sheet 1

INVENTOR
Morey Bunin
BY
Pennie, Edmonds, Morton, Barrows & Taylor
ATTORNEYS

Jan. 1, 1963 M. BUNIN 3,070,920
PUPPET LIKE FIGURE AND ANIMATION APPARATUS
Filed Aug. 4, 1960 2 Sheets-Sheet 2

INVENTOR
Morey Bunin
ATTORNEYS

United States Patent Office 3,070,920
Patented Jan. 1, 1963

3,070,920
PUPPET LIKE FIGURE AND
ANIMATION APPARATUS
Morey Bunin, New York, N.Y., assignor to Aniforms, Inc., New York, N.Y., a corporation of New York
Filed Aug. 4, 1960, Ser. No. 47,505
1 Claim. (Cl. 46—126)

This invention relates to a novel puppet-like essentially two-dimensional open outline figure which may be continuously manipulated and deformed and to a process utilizing the same to produce continuous motion animated characterizations for direct viewing and for motion picture photography and television.

Serially produced progressive line drawings have been used to simulate living or moving inanimate objects in, for example, animated movie cartoons and television cartoons and commercials. Such cartoons or commercials have been produced by stop motion techniques in which a series of line sketches or drawings simulating progressive action are individually and serially photographed on the successive frames of a motion picture film for ultimate exhibition by motion picture or television techniques.

Animation also has been achieved in puppet theaters and in the production of motion pictures by employing three-dimensional figures which, by invisible control means and remote manipulation, simulate continuous movement. Elastic materials having the contour of a face or the like with internal controls for producing distortion therein or animation thereof are sometimes employed in such figures.

The principal object of the present invention is to provide essentially two-dimensional open outline figures which are particularly suitable for the continuous production of animated line characterizations. This invention also has for an object, the provision of an improved process for continuous production of motion pictures in which such characterizations are employed.

The essentially open two-dimensional figures of my invention can be constructed to simulate many objects such as, to mention a few examples, people, animals, insects, trees, flowers or abstract designs. The figures may be composed of flexible materials such as sponge or foam polyurethane, polyester, or the like. My figures are cut from sheets of such materials in the form of an interiorly open outline of the object to be simulated. Manipulating apparatus such as rods or wires are attached to the figures for supporting and remotely moving and controlling them.

One or more such figures may be employed in one scene or sequence. Also, secondary figures or forms cut from suitable materials may also be employed to simulate particular features or components such as an eye, stomach, or other items for which particular emphasis may be desired.

The controls for moving the puppet-like outline figures of my invention are arranged so as to be invisible to the audience. This can be done by using thin wires attached to the flexible material. It can also be done by using rods which are coated with a non-reflective paint or material having a color conforming to that of a background. When the figures are activated remotely the effect of two-dimensional outline figures which move about, change expression and the like, similar to that produced by the use of the stop motion techniques of serially produced, animated progressive motion cartoons, is obtainable directly.

With proper lighting, continuous photographing or video taping of the moving forms can be readily accomplished with a motion picture or television camera. No unusual equipment is needed and production time is minimal.

In the following detailed description of the present invention, reference will be made to the accompanying drawings in which.

Figure 1:
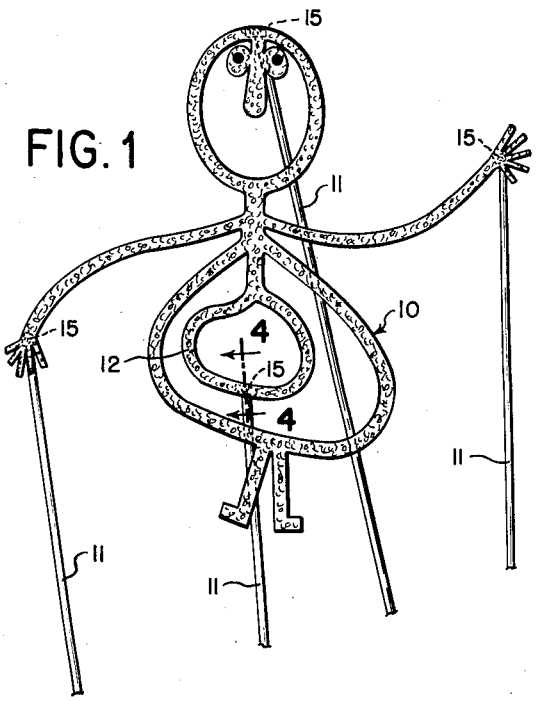
FIG. 1 shows an embodiment of the present invention in which one primary form is fashioned to indicate a human figure.

In the embodiment of FIG. 1 a primary form 10 of my invention is shown supported on control rods 11. Form 10 is in the shape of an outline of a human figure and includes an integral portion in the outline of a stomach 12.

The primary form is fabricated, as mentioned, from a flexible material such as sponge or foam polyurethane, polyester or the like. I have used polyurethane material successfully.

Flexibility in the sense of being deformable without suffering permanently induced change in shape is the principal criterion for choosing the material to be used. Elasticity in the sense of extensibility is not a fundamental requisite although the materials indicated do have some elasticity. In other words, the material to be used must be readily continuously deformable so that the two-dimensional figures of my invention can be manipulated through continuous successive positions.

The control apparatus shown comprises a plurality of rods 11 which work very well. Arrangements using wires, cords or gloved hands or various combinations of the same in any number desired may also be used. The forms of my invention are supported and operated with the control apparatus.

The control apparatus is attached to the forms and usually arranged to extend to a remote location outside the field of view of an audience or camera. The number of independent control mechanisms and the points on the forms at which they are attached depends only on the motion, expression or deformation desired for a particular scene. This matter can be readily resolved and would be determined, for example, by a director, or operator after obtaining a small amount of experience in the operation of the control apparatus.

It is necessary, however, that the portion of the control apparatus which remain in the field of view be invisible. Invisibility may be obtained by various techniques within the skill of the art such as, for example, by covering the apparatus with a non-reflective material or paint colored to conform to the color of a background; by using wires or cords of small diameter or by using various lighting arrangements. In the case of the control rods 11 shown in the drawings a dull or light absorbing cloth or paper covering may be used.

In FIG. 1, separate control rods 11 are attached to the head, stomach and arms of primary form 10. Animation of the human figure shown is achieved by manipulation of the remote ends of the rods. The rods are sufficiently long to extend outside the field of view such as to locations behind a curtain so that the operators are hidden.

Figure 3:
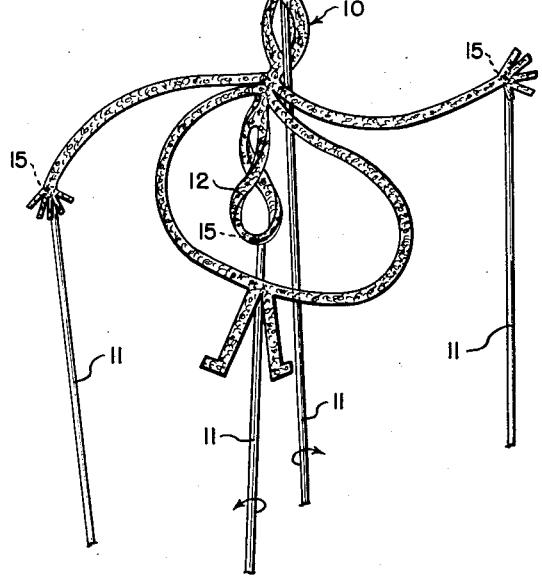
FIG. 3 is a view of the embodiment of FIG. 1 in an illustrative deformed position.

The two-dimensional outline form is then manipulated through successive positions to give the action desired. The action can be provided smoothly and continuously by a skilled operator. A typical position for the puppet-like figure 10 is shown in FIG. 3 where the outline shape has been deformed to illustrate a person worried about a distressed or upset stomach.

Figure 2:
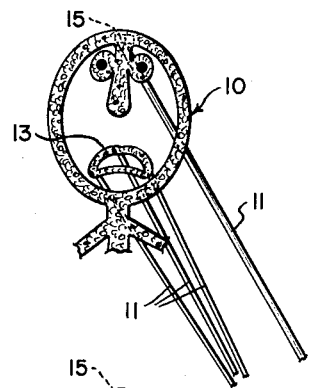
FIG. 2 shows a second embodiment of the present invention in which a secondary form fashioned to indicate a mouth is used with the primary form of FIG. 1.

Principal features of a form such as 10 can be emphasized for various effects by adding secondary forms such as an arm or mouth. The secondary forms may be supported for manipulation independently of the associated primary form. In the embodiment of FIG. 2 a secondary form 13 in the shape of an outline of a mouth is shown supported on rods 11 for remote manipulation independently of primary form 10.

Figure 4:
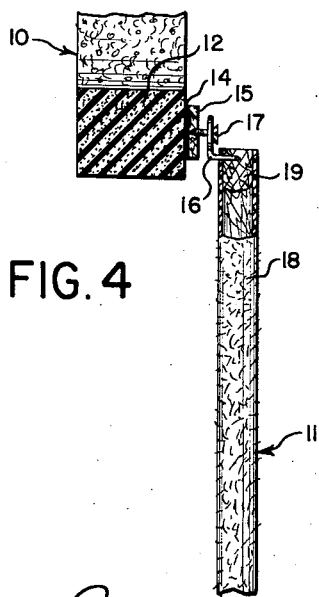
FIG. 4 is a section view taken along line 4—4 of FIG. 1 showing details of a typical arrangement for attaching the control apparatus to the forms of the invention.

A typical arrangement for attaching a control rod 11 is shown in FIG. 4. Here, a small block of wood 15 is attached to the back of stomach portion 12 of form 10 with a suitable glue or cement 14. One end of a bracket or right-angle screw eye 16 is imbedded in the control rod material 19. This material, conveniently, can also be wood. A screw 17 is then used to hold the bracket 16 against the block 15. Many other arrangements, of course, may be used, including simply gluing the rod 11 to the form 10. This would be satisfactory if one knows the position of a rod on the form will not be changed during a series of different scenes calling for different types of action. Also turning a straight screw eye into block 15 would suffice for attaching wires or cords instead of rods 11.

Also shown in FIG. 4 is a cloth cover or mask 18 on rod 11. This cover is attached to the rod so as to make it invisible against a backdrop as has been discussed. I have used black velvet as a mask for operation before a black background.

Figure 5:
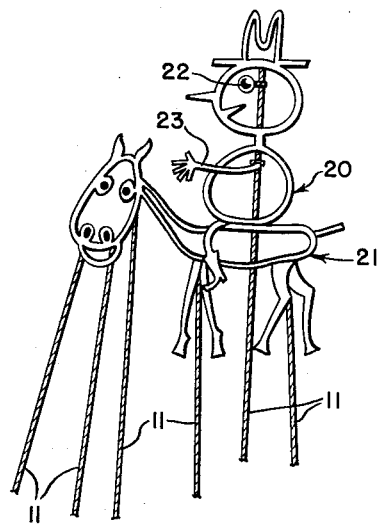
FIG. 5 shows another embodiment of my invention in which several primary and secondary forms are used.
Figure 6:
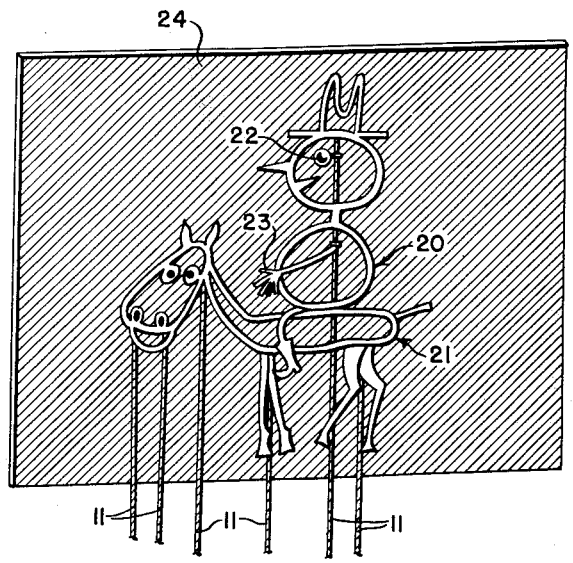
FIG. 6 shows the embodiment of FIG. 5 in front of a backdrop to illustrate a technique which may be used to render those portions of the control apparatus which are in the field of view invisible.
Figure 7:
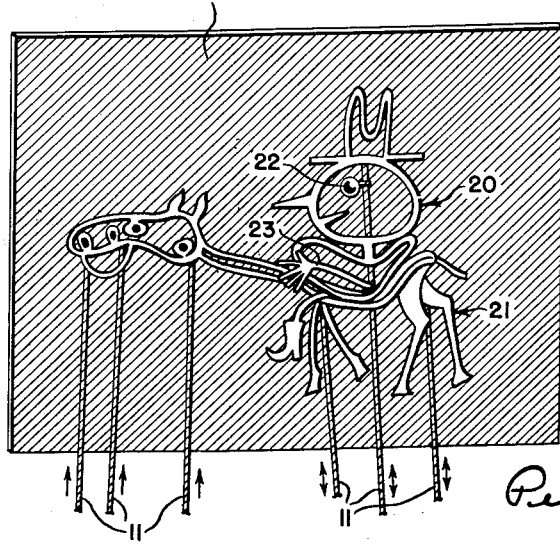
FIG. 7 shows the embodiment of FIG. 5, also before a backdrop, in an illustrative deformed position.

Another embodiment of the invention is illustrated in FIGS. 5–7. In this embodiment there are two primary forms 20 and 21 shown in the open outline shapes of a horse and a rider. A plurality of control rods 11 are again shown for support and remote manipulation of the figures.

In addition, primary rider form 20 also has secondary forms 22 and 23 to represent an eye and an arm. Here, the eye and arm secondary forms 22 and 23 are attached to a control rod which is also attached to the head of the rider. Thus the secondary forms can easily be made to move up and down in synchronism with the rider's head as, for example, the horse is made to jog across a background scene or in front of a moving background. The secondary forms 22 and 23 can as well be attached to separate control rods, as explained in connection with the embodiment of FIG. 2, for independent action.

A background 24 is shown in FIGS. 6 and 7 to indicate how similar colors or materials can be employed to render the control rods invisible in the field of view. The basic forms of the invention then, of course, have colors contrasting to the color of the background so the moving-line type characterizations can be readily seen.

The puppet-like figures of my invention can be manipulated so as to change expression, collapse into a completely non-recognizable form (note FIG. 7), wave, walk, dance and so forth. In the case of simulated inanimate objects, they can be changed from one form to another. When operated in front of a suitable backdrop such as that shown, the resulting effect is of figures moving or deforming in any two dimensional direction with no apparent external control. They can be manipulated vertically and horizontally and can give the effect of floating in air without any visible means of support.

The figures shown in the drawings are only exemplary. Many other forms, as mentioned, can be provided in any shape or design desired. The primary forms are cut in the shape of an outline of the desired object. They are basically two-dimensional except for the thickness of the material employed. This thickness may be, for example, from one-eighth inch to two inches, sufficient to make the portions of the forms between control rods (or wires) self-supporting. But thickness is not otherwise critical unless, for example, shadow effects might be desired. Also, some sections of a figure can be stiffened by gluing a rigid member on the side away from the audience to permit movement of certain portions without deforming other portions.

The puppet-like bodies of my invention are particularly advantageous for use in the production of animated cartoons and television commercials. Continuous movement of the line figures can be provided before a motion picture or television camera. With suitable colors and lighting the manipulating apparatus will not be visible and the moving forms can be continuously photographed or taped for later projection.

For making a film of animated, moving line figures the savings in both time and money obtained by using my invention are significant when compared to the complexity of using stop-motion techniques previously required. When one realizes that thousands of individual drawings may be required for one stop-motion production, the advantages of providing continuous motion with my moving-line type figures are quite apparent.

In a particular, with my invention, the advantage of using live action subjects can be realized in production of animated cartoons.

In producing a stop-motion animated film cartoon, it is necessary for a director to visualize his action in a series of pen lines, plan his entire continuity, entrances, exits, dissolves, cuts, and so forth; in other words, do all his editing before pictures are drawn. Then teams of artists are normally employed to develop the drawings, each drawing is then individually photographed, and so on, until the pre-box office investment for such a film is very large. Once filmed, the product is quite inflexible and the only editing which a director can then do is to eliminate scenes, and even this is not always possible.

By using my continuously deformable puppet-like figures it is possible, as with live actors, to rehearse the characters, see the immediate results and select the best of several takes for the final product. Narration, music and special sound effects can be recorded simultaneously with filming of the action and the special requirements for synchronizing recording operations with a specific frame or number of frames as in the production of an animated stop-motion film, are avoided.

Continuous production of animated moving-line type characterizations is, as well, a new artistic medium made possible by my invention. Live presentations in theatres and clubs can be readily accomplished. The figures required can, for example, be especially prepared to caricaturize one or more subjects particularly known by a club or association for one performance only. They can be quickly and inexpensively constructed by relatively unskilled individuals.

For live performances with my invention, effects can be achieved which are very roughly comparable to those obtainable by an artist skilled in the use of chalk talks. But the new medium is both more subtle and more powerful in its intrinsic capability for provoking audience reaction.

It should be understood that the embodiments described are illustrative and that many different forms and changes, which will be apparent to those skilled in the art, can be made without departing from my invention. Accordingly, the scope of my invention is defined in the following claims.

I claim:

Apparatus for continuous production of moving-line type animated characterizations which apparatus comprises in combination at least one essentially two dimensional open outline primary form fabricated from readily deformable material in the shape of an outline of an object, at least one secondary essentially two dimensional form fabricated in the shape of a feature of said object and means connected to each of said primary and secondary forms for manipulation of the same, said means having a cover colored to conform to that of a background whereby said means are inconspicuous before said background.

References Cited in the file of this patent

UNITED STATES PATENTS

| | | |
|---|---|---|
| 1,788,671 | Heideklang | Jan. 13, 1931 |
| 2,039,731 | Martin | May 5, 1936 |
| 2,334,486 | Froehlig | Nov. 16, 1943 |
| 2,340,172 | Buchanan | Jan. 25, 1944 |
| 2,384,341 | Richards | Sept. 4, 1945 |
| 2,466,214 | Deaton | Apr. 5, 1949 |
| 2,684,012 | Hebert | July 20, 1954 |
| 2,862,331 | Oppenheimer | Dec. 2, 1958 |